US012802482B2

(12) United States Patent
Gao et al.

(10) Patent No.: US 12,802,482 B2
(45) Date of Patent: Nov. 17, 2026

(54) PROCESSING MULTI-TYPE DOCUMENT FOR MACHINE LEARNING COMPREHENSION

(71) Applicant: International Business Machines Corporation, Armonk, NY (US)

(72) Inventors: Li Juan Gao, Xi'an (CN); Zhong Fang Yuan, Xi'an (CN); Yuan Yuan Ding, Shanghai (CN); Tong Liu, Xi'an (CN); Jin Zhou, Dalian (CN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 18/636,555

(22) Filed: Apr. 16, 2024

(65) Prior Publication Data

US 2025/0322684 A1 Oct. 16, 2025

(51) Int. Cl.
*G06F 40/106* (2020.01)
*G06F 40/284* (2020.01)
(Continued)

(52) U.S. Cl.
CPC .......... *G06V 30/414* (2022.01); *G06F 40/106* (2020.01); *G06F 40/284* (2020.01); *G06F 40/40* (2020.01); *G06V 30/191* (2022.01)

(58) Field of Classification Search
None
See application file for complete search history.

(56) References Cited

U.S. PATENT DOCUMENTS 12,056,771 B1 * 8/2024 Contryman ............ G06Q 40/08
12,093,658 B1 * 9/2024 Silver ..................... G06F 40/40
(Continued)

FOREIGN PATENT DOCUMENTS

CN 111159416 B 7/2020
CN 116821168 A 9/2023
(Continued)

OTHER PUBLICATIONS

International Searching Authority, "Notification of Transmittal of the International Search Report and the Written Opinion of the International Searching Authority, or Declaration," Patent Cooperation Treaty Jun. 10, 2025, 13 pages, International Application No. PCT/ EP2025/057618.

Guo, Y., et al., "PPTC Benchmark: Evaluating Large Language Models for PowerPoint Task Completion", arXiv:2311.01767v2 [cs.CL], Nov. 7, 2023, 17 pages.

(Continued)

*Primary Examiner* — Linda Huynh
(74) *Attorney, Agent, or Firm* — Scully, Scott, Murphy & Presser, P.C.

(57) ABSTRACT

A computer-implemented method includes receiving a digital image of a document and a workflow describing an automation task. The method also include converting the digital image of the document into rich text that includes layout information in the document. The method further includes creating, based on the rich text and the workflow, a tree of thoughts that includes nodes and edges connecting the nodes and that binds at least some nodes representing the rich text with a task node representing the automation task. The method also includes converting the nodes and edges of the tree of thoughts into a natural language text. The method further includes inputting the natural language text into a language machine learning model with attention given to a token in the natural language text representing the task node. The language machine learning model, in response, outputs a result of completing the automation task.

20 Claims, 8 Drawing Sheets

(51) Int. Cl.

| | |
|---|---|
| ***G06F 40/40*** | (2020.01) |
| ***G06V 30/19*** | (2022.01) |
| ***G06V 30/414*** | (2022.01) |

(56) References Cited

U.S. PATENT DOCUMENTS

| | | | | |
|---|---|---|---|---|
| 2021/0035556 | A1 | 2/2021 | Shen et al. | |
| 2021/0365502 | A1* | 11/2021 | Hutchins | G06N 5/022 |
| 2022/0156300 | A1* | 5/2022 | Paruchuri | G06N 3/08 |
| 2023/0230408 | A1* | 7/2023 | Arroyo | G06Q 30/0201 382/156 |
| 2023/0274089 | A1 | 8/2023 | Tunstall-Pedoe et al. | |
| 2023/0386236 | A1 | 11/2023 | Rimchala et al. | |
| 2024/0096125 | A1* | 3/2024 | Yebes Torres | G06F 40/30 |
| 2024/0346611 | A1* | 10/2024 | Brown | G06F 40/103 |
| 2024/0362286 | A1* | 10/2024 | He | G06F 16/93 |
| 2025/0149153 | A1* | 5/2025 | Matson Chavarukattil | G06F 40/205 |
| 2025/0232187 | A1* | 7/2025 | Long | G06N 3/096 |
| 2025/0272279 | A1* | 8/2025 | Kshirsagar | G06F 16/2428 |

FOREIGN PATENT DOCUMENTS

| | | | | |
|---|---|---|---|---|
| CN | 119884357 A | * | 4/2025 | G06F 16/367 |
| EP | 4002296 A | | 5/2022 | |

OTHER PUBLICATIONS

Wen, Y., "MindMap: Knowledge Graph Prompting Sparks Graph of Thoughts in Large Language Models", inarXiv: 2308.09729v4 [cs.AI], Sep. 15, 2023, 14 pages.

* cited by examiner

PROCESSING MULTI-TYPE DOCUMENT FOR MACHINE LEARNING COMPREHENSION

BACKGROUND

The present application relates generally to computers, computer applications, machine learning, optical character recognition, and machine learning analysis of documents.

BRIEF SUMMARY

The summary of the disclosure is given to aid understanding of a computer system and method of multi-type document application, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in some embodiments, includes receiving, by a processor set, a digital image of a document and a workflow describing an automation task. The computer-implemented method also includes converting, by the processor set, the digital image of the document into rich text that includes layout information in the document. The computer-implemented method also includes creating, by the processor set, based on the rich text and the workflow, a tree of thoughts that includes nodes and edges connecting the nodes and that binds at least some nodes representing the rich text with a task node representing the automation task. The computer-implemented method also includes converting, by the processor set, the nodes and edges of the tree of thoughts into a natural language text. The computer-implemented method also includes inputting, by the processor set, the natural language text into a language machine learning model with attention given to a token in the natural language text representing the task node, the language machine learning model outputting a result of completing the automation task.

A computer system in some embodiments includes a processor set. The computer system also includes a set of one or more computer-readable storage media. The computer system also includes program instructions, collectively stored in the set of one or more computer-readable storage media, for causing the processor set to perform the following computer operations: receive a digital image of a document and a workflow describing an automation task; convert the digital image of the document into rich text that includes layout information in the document; create, based on the rich text and the workflow, a tree of thoughts that includes nodes and edges connecting the nodes and that binds at least some nodes representing the rich text with a task node representing the automation task; convert the nodes and edges of the tree of thoughts into a natural language text; and input the natural language text into a language machine learning model with attention given to a token in the natural language text representing the task node, the language machine learning model, in response, outputting a result of completing the automation task.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
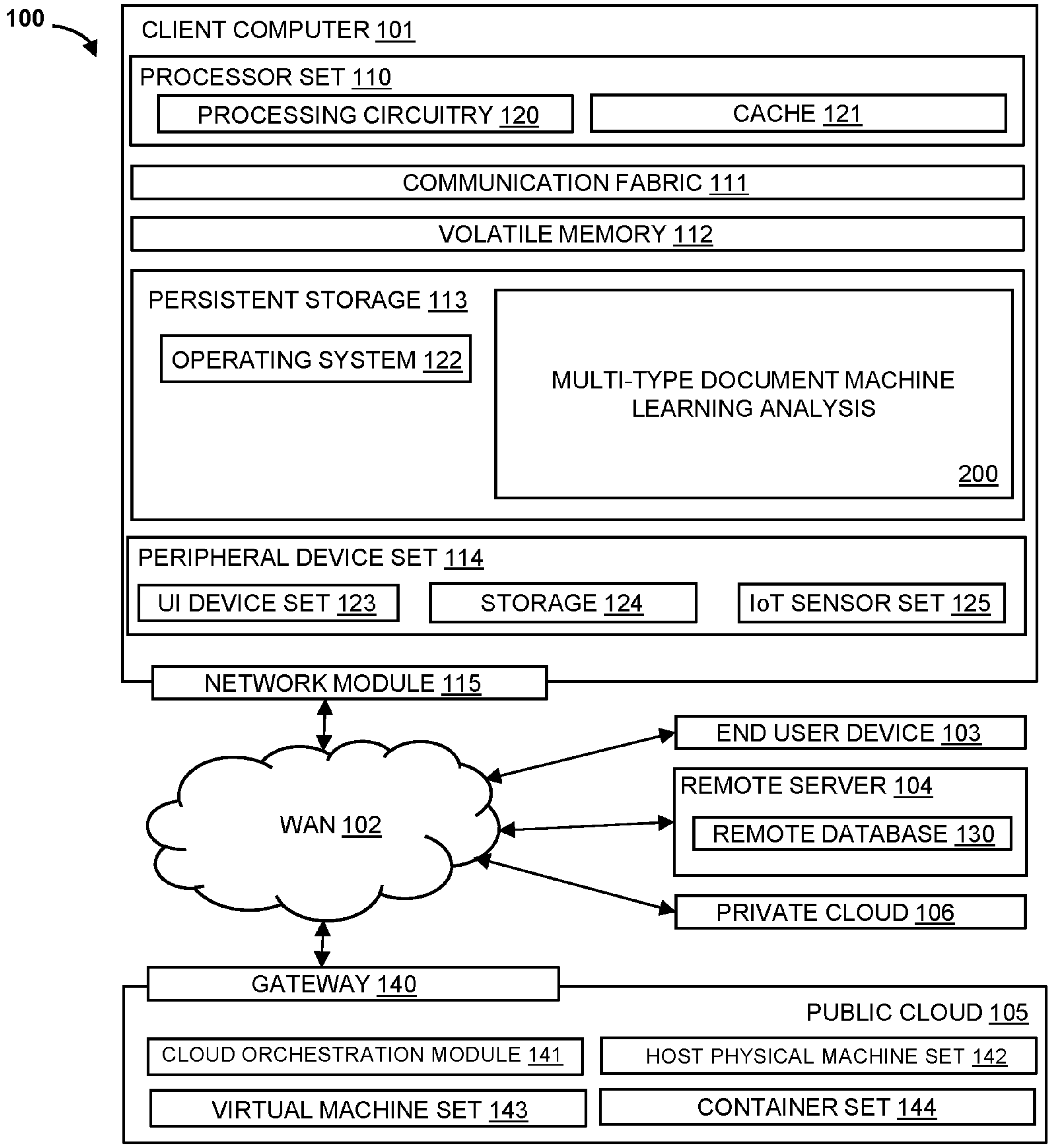
FIG. 1 shows an example of a computing environment, which can implement multi-type document application in some embodiments.

A computer-implemented method, in some embodiments, includes receiving, by a processor set, a digital image of a document and a workflow describing an automation task. The computer-implemented method also includes converting, by the processor set, the digital image of the document into rich text that includes layout information in the document. The computer-implemented method also includes creating, by the processor set, based on the rich text and the workflow, a tree of thoughts that includes nodes and edges connecting the nodes and that binds at least some nodes representing the rich text with a task node representing the automation task. The computer-implemented method also includes converting, by the processor set, the nodes and edges of the tree of thoughts into a natural language text. The computer-implemented method also includes inputting, by the processor set, the natural language text into a language machine learning model with attention given to a token in the natural language text representing the task node. The language machine learning model, in response, outputs a result of completing the automation task.

In this way, structured data is organized into text inputs that language machine learning models can easily comprehend, thus enabling efficient automation workflows. Various types of documents can be organized into inputs that language machine learning models can easily comprehend. This enables efficient automation processing of diverse document types, such as invoices, contracts, reports, and more, improves digital document processing efficiency and accuracy while reducing the cost and error rate of manual operations. Use cases can include, but are not limited to, automated invoice reimbursement, contract review, and document summarization.

One or more of the following features can be separable or optional from each other. In some embodiments, the inputting the natural language text into the language machine learning model includes iteratively inputting the natural language text to complete the automation task. In this way, an automation task can be completed in an accurate and/or precise manner, for example, based on feedback from a previous iteration.

In some embodiments, computer vision and optical character recognition techniques are used to convert the digital image of the document into the rich text. In this way, structural content and layout, information contained in the document content, can be extracted automatically without needing human input.

In some embodiments, the result output by the language machine learning model is presented on a user interface. In this way, a human-computer interface can provide the completed automation task and/or output of the completed automation task to facilitate information sharing, e.g., visibly, with an external agent who evaluates information and makes other decisions based on the information.

In some embodiments, the result that is output by the language machine learning model is fed into another automation task. In this way, another computer-implemented component can link with and use the result of the language machine learning model, for performing another automated task.

In some embodiments, the layout information includes images and associated captions contained in the document. In this way, elements of the document can be converted into rich text, incorporated into the tree of thoughts, and also incorporated into the natural language text for understanding by the language machine learning model.

In some embodiments, the layout information includes formatting of document content contained in the document. In this way, non-text information contained in the document can be converted into rich text, incorporated into the tree of thoughts, and also incorporated into the natural language text for understanding by the language machine learning model.

A system including at least one computer processor and at least one memory device coupled with the at least one computer processor is also disclosed, where the memory device stores program instructions that can be executed by the computer processor to cause the performance of one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as multi-type document machine learning analysis code 200. In addition to multi-type document machine learning analysis code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multi-type document machine learning analysis code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in multi-type document machine learning analysis code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in multi-type document machine learning analysis code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Extracting information from images is in demand for a highly diverse set of applications in computer processes and automated workflows. These applications includes tasks such as basic invoice/contract information extraction, complex extraction of irregularly formatted report information, as well as an extraction of complex, heterogeneous data sources and uncertain pattern information. To address these challenges, scene-based training methods are commonly employed, where each scene requires a complete data collection, data annotation, data quality enhancement, model training, model optimization, and online deployment process. However, existing solutions suffer from drawbacks such as high manual workload and poor transferability. Throughout the entire model deployment lifecycle, a considerable amount of manual work is required, and the trained models cannot be easily transferred to other scenarios.

Furthermore, existing large-scale machine learning models perform well when processing natural language text data but exhibit subpar performance when dealing with structured format documents (e.g., word processing editor documents, portable document format (PDF)) and tabular data (e.g., spread sheet application format, comma-separated values (CSV)) or when directly inputting optical character recognition (OCR)-recognized text into large models. This is due to the loss of original formatting, positional information, other layout data, and image data when directly inputting these documents.

In some embodiments, a computer-implemented method and/or system is disclosed that organizes structured data (e.g., layout data) into text inputs that large language models can comprehend, thus enabling efficient automation workflows.

Large language models or LLMs are artificial neural networks, for example, which can have transformer-based architecture or other architectures, such as recurrent neural networks. Large language models are capable of performing natural language processing to understand natural language and performing natural language generation. A large language model is trained to understand and generate human-like text. Its function includes language understanding, text generation, information extraction, and task-specific applications. When given input text, it processes the data through neural networks to generate contextually relevant responses or outputs, leveraging its trained parameters and deep learning techniques. Large language models are a type of language machine learning models and, therefore, references throughout to large language models also refers to language machine learning models. Language machine learning models predict and generate plausible language.

In some embodiments, the computer-implemented method and/or system combines techniques such as tree of thoughts and layout analysis to organize various types of documents into inputs that large language models can easily comprehend. This combined approach enables efficient automation workflows. A computer-implemented method in some embodiments includes a process that performs layout analysis and OCR recognition, a process that builds trees of thoughts based on document content and tasks, and a process that inputs organized text and required tasks into a large language model and iteratively completes tasks. A system in some embodiments includes a processor set and program instructions stored in computer-readable storage media that cause the processor set to perform such processes. In various embodiments, the methods, processes, acts and/or operations described herein are performed by a computer or a processor set running computer codes or instructions (e.g., shown at 200 in FIG. 1) that cause the computer or the processor to perform those methods, processes, acts and/or operations.

Figure 2:
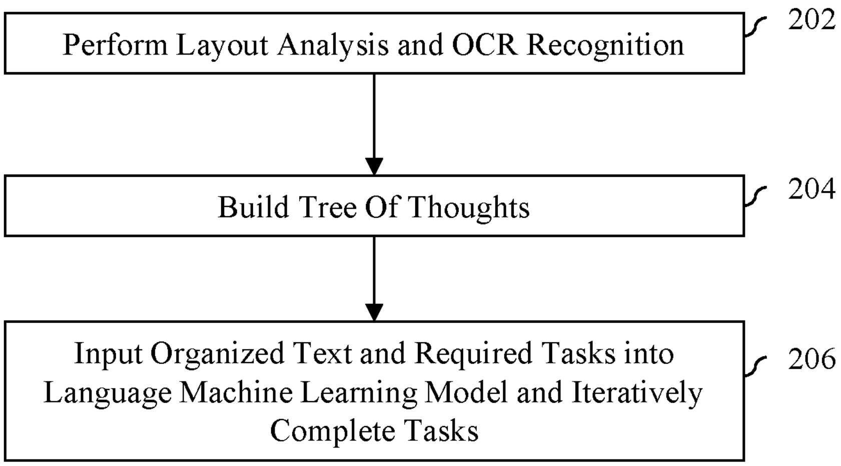
FIG. 2 is a flow diagram illustrating a computer-implemented method for multi-type document application in some embodiments.

FIG. 2 is a flow diagram illustrating a computer-implemented method in some embodiments. The method in some embodiments performs multi-type document analysis based on large language model combining tree of thought and layout information. At 202, layout analysis and OCR recognition are performed for a given document. The given document can be a scanned image, e.g., a digital image, of a document containing multiple types of data such as images, text, text within tables, text with symbols, or another type of data. In some embodiments, for example, for documents containing tables, invoices, and other content, the method employs layout analysis using computer vision algorithms to distinguish between modular components in a document such as tables, body text, headings, and images within the document. Simultaneously, substantially simultaneously, and/or in parallel, OCR technology is utilized to recognize the text in the document, for example, text content in a module or image component (e.g., table, body text, heading, and/or other modular components in the document), for example, recognizing text in the document in various forms and within various modular components. The text content recognized can be associated with a modular component of the document, e.g., the text appearing in a column heading of a table, etc. Within the data produced by the automated analysis of the image, the association includes connecting, joining, and/or relating data representative of the recognized text with data representative of the recognized modular component. Multiple information integration is performed where, for formatted documents, the method leverages the positional information and formatting (e.g., such as font, color, style, font size, and/or other formatting) of the text, and also considers various other information, such as the type of text content. For images within the document, the method utilizes one or more image captioning algorithms to convert the images into text. The image captioning algorithms include machine learning to generate text that describes the image. In some embodiments, content of the document can be converted into rich text, e.g., text with metadata. Metadata provides information about the text, e.g., learned from extracting the layout, formatting, and/or other information about the text in the document. Through the combination of these various methods, all elements within the images are eventually recognized. As described above, the method utilizes layout information from layout analysis and OCR technology to process the document's structure and text information. In this way, for example, the document content can be more easily comprehensible to large language models, thereby enhancing processing efficiency and accuracy.

At 204, the method includes building a tree of thoughts based on document content and tasks. Tasks, for example, are given as or extracted from a workflow. Such workflow can pre-exist or is given as an input. A workflow can be algorithm or a sequence of steps, which define one or more tasks, also referred to as one or more automation tasks. For instance, a workflow defines a set of (or a series of) automation tasks to be performed or completed. For different types of documents, the method constructs a tree of thoughts (TOT), also referred to as a mind map, to organize and describe the document's content and the documents' association with automation tasks, for example, relevance to automated tasks. Tree of thoughts is a graphical representation, a tree-like structure, which displays information (e.g., key information), structures, and hierarchical relationships within the document, e.g., extracted from the layout of the document. When building the tree of thoughts, the method considers the document's topics, chapters or sections, paragraphs, and/or other modular content items, as nodes of the tree, and key concepts, facts, data, and/or other content, as the edges of the tree. The tree of thoughts can also include additional metadata (e.g., author, date, source). The tree of thoughts binds such nodes to automation tasks that are relevant. The tree of thoughts (data structured into the tree of thoughts) is converted in an automated manner into a natural language text description.

At 206, the method includes inputting the organized text and required tasks into a large language model and iteratively completing tasks. For example, once the document content and tree of thoughts including tasks are constructed at 202 and 204 respectively, the method includes inputting the text description organized based on the tree of thought into the large language model for processing. The input is iteratively adjusted based on the feedback from the model. The large language model can comprehend various information within the tree of thoughts and perform or initiate performance of relevant operations based on the task requirements. In case some information is missing during the process, the text is further organized using the tree of thoughts and input into the large model until the automation workflow is completed.

The processing in the method shown in FIG. 2, in some embodiments, develops an approach that combines tree of thoughts and layout information for large language models for processing various types of documents. This method fully leverages the powerful processing capabilities of large language models while effectively organizing document content through the use of tree of thoughts and layout analysis, thereby achieving automated processing of multiple document types. By inputting the tree of thoughts according to the present disclosure, as a prompt into a large language model, the method enables the automation of tasks involving various document types, including key information extraction, document summarization, and categorization. This method can be widely applied in various scenarios such as invoice reimbursement, contract review, and document summarization-effectively improving document processing efficiency and accuracy.

Layout analysis and OCR recognition, for example, at 202, is further described below. In some embodiments, processing multiple document types is performed using a combination of layout analysis and OCR to recognize elements (e.g., main elements) within a single document. Using computer vision algorithms, different types of elements in the document, such as tables, body text, headings, and images, are distinguished. Layout analysis identifies the document's structure, thereby facilitating better extraction and comprehension of its content.

Figure 3:
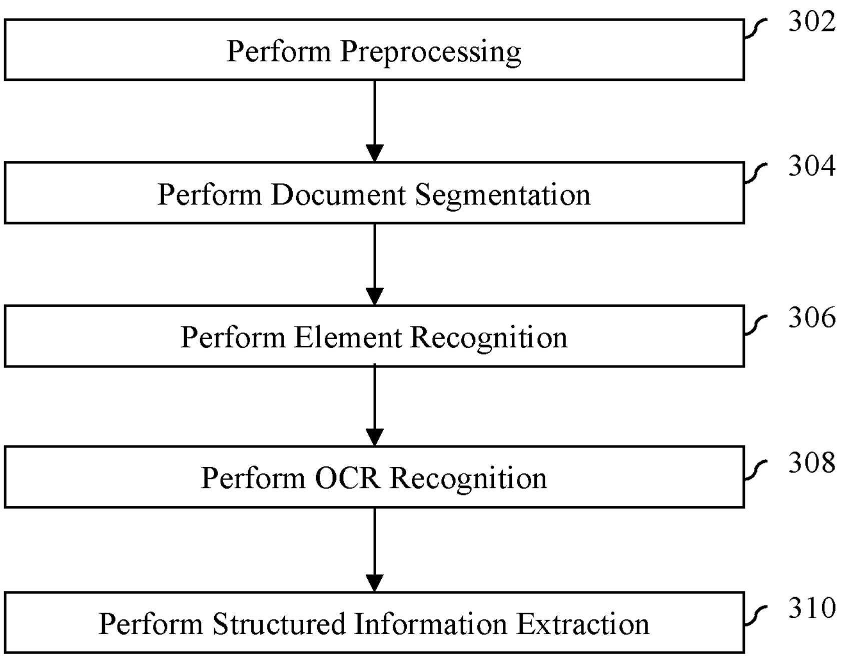
FIG. 3 is a flow diagram that illustrates layout analysis and OCR recognition in some embodiments.

FIG. 3 is a flow diagram that illustrates layout analysis and OCR recognition in some embodiments. Input in the process shown in FIG. 3 can be a scanned-in, digital, image of a document or the like. Output of the process is rich text (e.g., text content of the document with layout information or source and type of the text such as that the text appears in a table, with font size, with shading that represents importance, etc.). At 302, preprocessing is performed. For example, preprocessing operations are applied to an input document, such as noise removal, image resizing, and contrast adjustment. Preprocessing the input document improves the accuracy and efficiency of subsequent processing. At 304, document segmentation is performed. In some embodiments, document segmentation is performed by using computer vision algorithms to partition the document into several regions, with each region containing one or more elements, such as text, images, etc. This step can be achieved through techniques like edge detection, color segmentation, and clustering. At 306, element recognition is performed. The elements within each region or segment produced in step 304 are recognized to determine their types, such as tables, body text, headings, etc. This step can involve techniques like feature extraction and inputting features or elements into one or more machine learning classifiers. At 308, OCR recognition is performed. OCR technology is applied to recognize the textual elements (e.g., tables, body text) and convert them into a computer-readable text format, enabling further processing. At 310, structured information extraction is performed. In some embodiments, a machine learning model that is a bidirectional long short-term memory with a conditional random field (e.g., BERT-Bi-LSTM-CRF) is used to perform the structured information extraction at 310. Based on the element types and positional information, the recognized text content is organized into a structured data format, such as tables or lists. This step aids in better understanding the document's content and structure.

Figure 4:
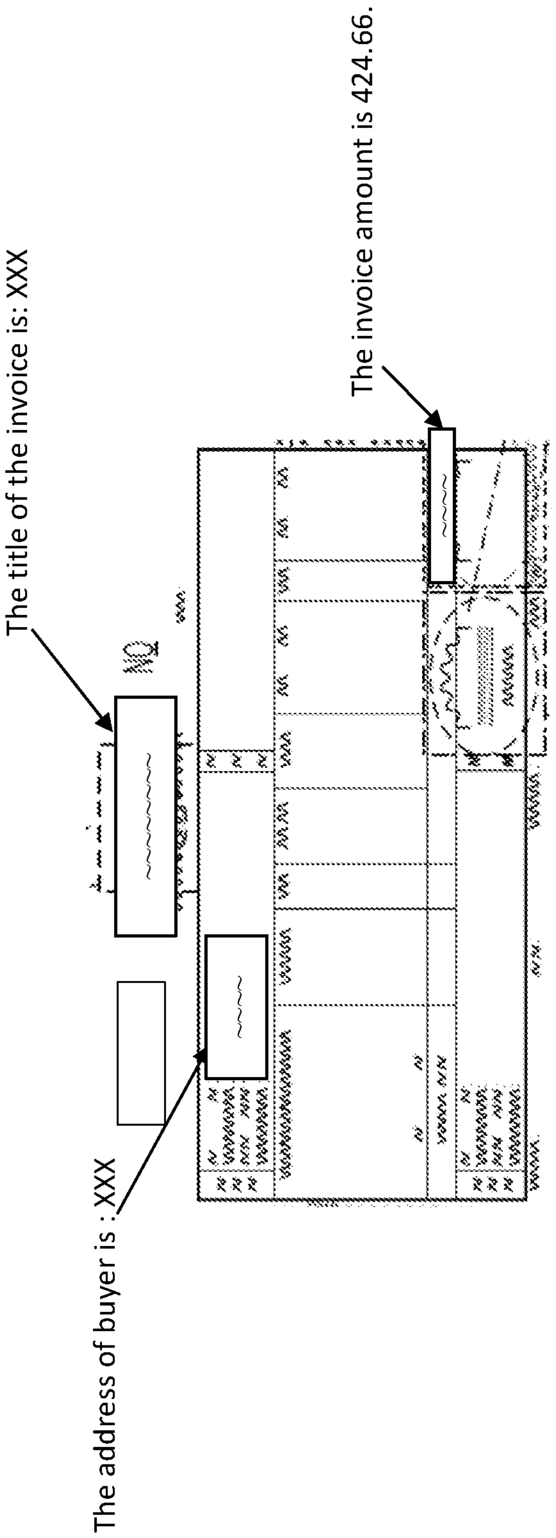
FIG. 4 illustrates an example of an input document that can be processed in some embodiments.

FIG. 4 illustrates an example of an input document that can be processed in some embodiments. FIG. 4 illustrates an invoice with various information organized in various structures and including a title, a name of a buyer, an address of a buyer, and a monetary amount for a transaction recorded by this invoice. An example document can include a tabulated format with information such as an address, title or header and numerical amounts.

For different types of documents, the method includes organizing and describing the document's content and its association with automation tasks using a tree of thoughts (TOT). The tree of thoughts is a graphical representation that displays information, structures, and hierarchical relationships that were captured from the document based on the information and presentation of the document. When building the tree of thoughts, the method uses the document's themes, chapters, paragraphs, and other structural information as nodes of the tree. Other information such as key concepts, facts, data, and other content within the document are treated/used as edges of the tree. Additionally, the tree of thoughts can include metadata such as author, date, and source.

Figure 5:
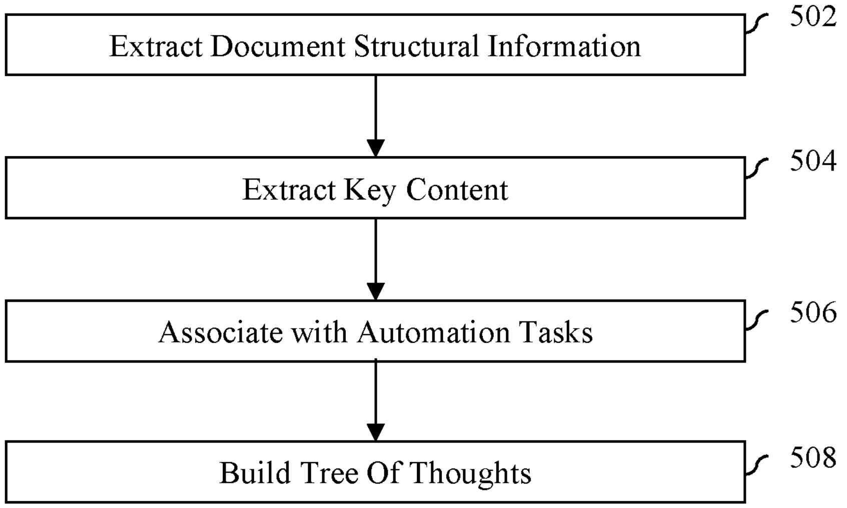
FIG. 5 is a flow diagram that illustrates a method of constructing or building a tree of thought based on document content and tasks in some embodiments.

FIG. 5 is a flow diagram that illustrates a method of constructing or building a tree of thought based on document content and tasks in some embodiments, for example, shown at 204 in FIG. 2. Thus, FIG. 5 provides details about the step 204 of FIG. 2. The tree of thought that is built organizes the content of the document based on its layout and tasks. A tree of thoughts facilitates a deeper thinking approach for large language models, when the large language models perform thinking. At 502, the method includes extracting document structural information. For example, the method includes analyzing the document to extract its themes, chapters, paragraphs, and other structural information. This information can be obtained from the document's table of contents, headings, subheadings, etc. In some embodiments, a machine learning technique such as BERT-Bi-LSTM-CRF is used to perform the structured information extraction at 502. For documents with no apparent structure, the method includes analyzing the grammar and semantic features of the text to identify implicit structural relationships.

At 504, the method includes extracting key content, e.g., key concepts, facts, data, and other content from the document. Natural language processing techniques such as keyword extraction, entity recognition, and relationship extraction are used to obtain this information in some embodiments. The extracted key content serves as the edges of the tree of thoughts, connecting various structural nodes.

At 506, the method includes associating with automation tasks. For example, during the construction of the tree of thoughts, the method also associates the document content with relevant automation tasks. This association can be achieved by adding task nodes and edges to the tree of thoughts. For example, in the context of invoice reimbursement, the method can add a reimbursement task node to the tree of thoughts and connect the reimbursement task node to key content such as invoice information.

At 508, the method includes building the tree of thoughts. The method organizes the extracted structural information, key content, and associated tasks into a complete tree of thoughts. This tree of thoughts can be presented in a graphical manner for easier comprehension and processing by users and large language models. The tree of thoughts is a graphical representation that shows key information, structures, and hierarchical relationships within the document. For example, when building the tree of thoughts, the method considers the document's topics, chapters, paragraphs, etc., as nodes of the tree, and key concepts, facts, data, etc., as the edges of the tree. It can also include additional metadata (e.g., author, date, source). In some embodiments, the constructed tree of thoughts can be shown as a JavaScript Object Notation (JSON), Extensible Markup Language (XML) or another like format. The constructed tree of thoughts also in at least some embodiments includes additional task nodes and/or edges representing identified automated tasks to be performed that are associated with the analyzed document and/or are taken from an associated workflow.

Figure 6:
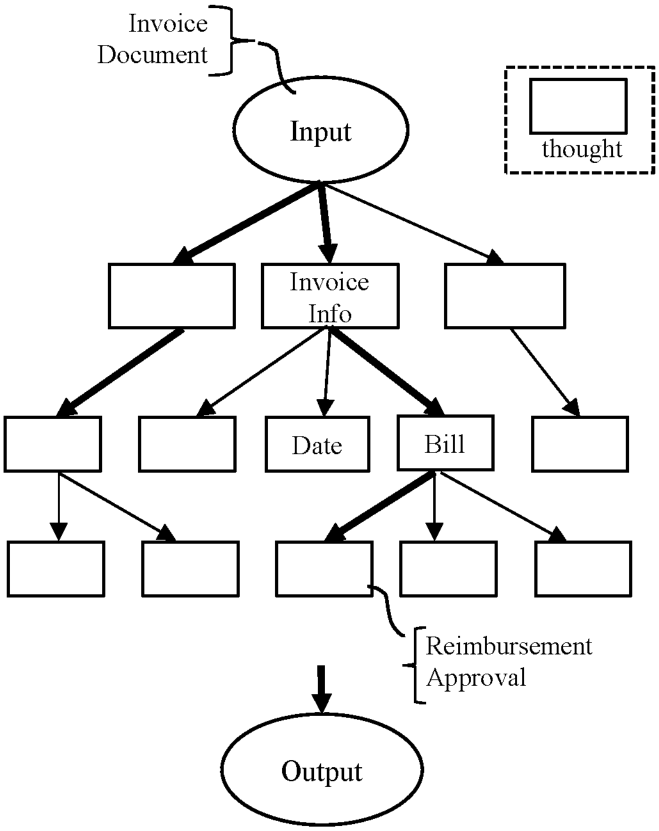
FIG. 6 illustrates an example tree of thoughts in some embodiments.

FIG. 6 illustrates an example tree of thoughts in some embodiments. Input to the code 200 for generating a tree of thoughts is a document in at least some embodiments. Input to the code 200 for generating the tree of thoughts also includes a workflow in some embodiments. Nodes in the tree of thoughts represent content and/or structural information contained in the document and task information contained in the workflow. A node can contain any information in the document. Edges in the tree of thoughts represent concepts connecting the nodes. Edges represent the relations between nodes, for example, "bill" is part of "invoice information". Output of this tree of thoughts-generation process is a final version of the tree of thoughts that is built.

Figure 7:
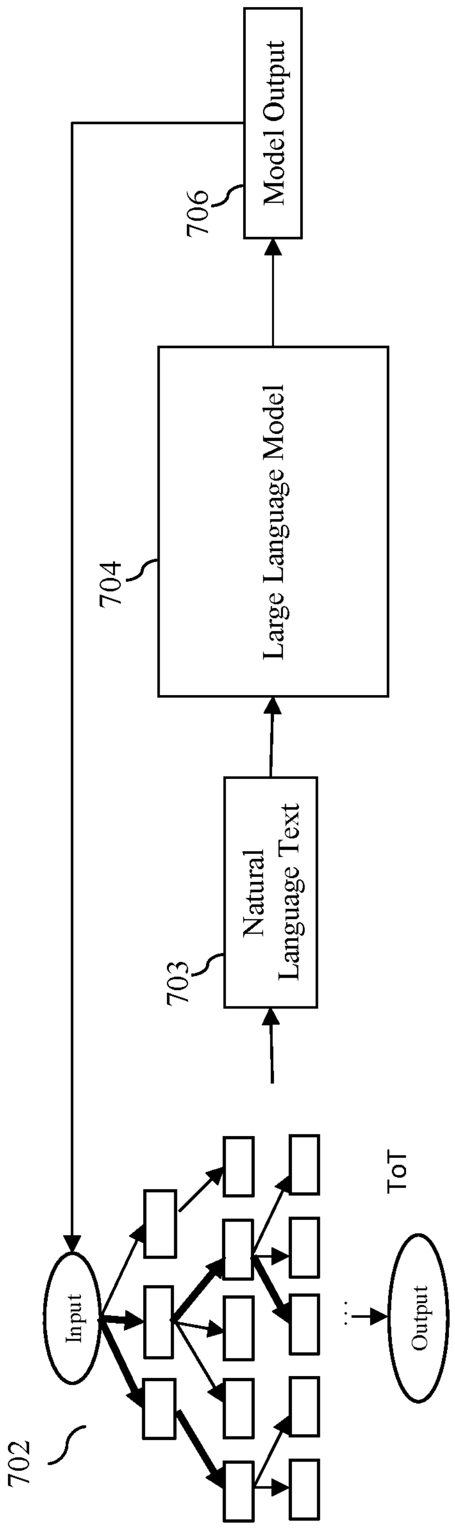
FIG. 7 is a diagram that illustrates inputting of results of a tree of thoughts into a large language model in some embodiments.

FIG. 7 is a diagram that illustrates inputting a tree of thoughts into a large language model in some embodiments. A computer system can be configured to implement or run components and/or processes shown in FIG. 7. Processes shown in FIG. 7, in some embodiments, organize the text and tasks, and iteratively complete the tasks. A tree of thoughts 702 is converted into a text format, e.g., natural language text 703, understandable by a large language model 704. For example, a processor converts a constructed tree of thoughts 702 (e.g., as described with reference to FIG. 5) into a text description, e.g., natural language text 703 that the large language model 704 can comprehend. This transformation is carried out following a specific order and/or rules (e.g., a general rule to traverse the nodes of the tree from top to bottom), for example, using a natural language representation to depict the nodes and edges within the tree of thoughts 702. Text description, e.g., natural language text 703, can be built by combining texts in the nodes and edges in a path of traversal from top to bottom of the tree of thoughts 702. In some embodiments, text description, e.g., natural language text 703 can be output using a depth-first traversal algorithm and a language machine learning model which outputs natural language text in response to receiving text fragments as input. The output text description in natural language represents some, most, or all of the various nodes and edges in the various embodiments.

The code 200 inputs the converted text description and task information together into the large language model 704 based on one or more task requirements or automation tasks. In some embodiments, the code 200 while inputting into the large language model, combines the text description organized from the tree of thoughts 702 with the task information that needs to be accomplished, e.g., based on associations of nodes that represent content and nodes that represent tasks. This combining allows the large language model 704 to perform relevant operations according to the specified task. Generally, text in the form of well-structured language is easier for large models to comprehend compared to unorganized text recognized by OCR. This transition of the tree of thoughts to text and combination with task information enhances the model's understanding of user inputs and improves its performance on corresponding tasks. In some embodiments, the large language model 704 is given task driven attention, e.g., the given task can provide attention to the large language model 704. For example, the large language model 704 pays attention to a node that is related to the given task, in turn, possibly introducing more information that is related to the node.

In at least some embodiments, the large language model 704 pays attention to a node that is related to the given automation task by leveraging natural language processing techniques such as contextual keyword recognition and attention mechanism utilization.

In at least some embodiments the large language model 704 employs contextual keyword recognition to pay attention to the automation task node. The contextual keyword recognition is an analysis that recognizes keywords or phrases indicative of task nodes within the natural language text. By understanding the context surrounding these keywords, the large language model 704 effectively pinpoints and focuses its attention on relevant task nodes. For instance, if the document discusses a specific automation task such as "data extraction," the large language model 704 can recognize related phrases or terms, e.g., using semantic word analysis, and prioritize the original term and the related phrases and terms during processing. In some embodiments, the large language model 704 adds additional weight to the tokens for these task-related terms as a part of providing this attention.

In at least some embodiments, the large language model 704 utilizes an attention mechanism, a component of neural networks, to dynamically weigh the importance of different parts of the input text. The large language model 704 employs this attention mechanism to allocate more focus and processing resources to task-related nodes within the natural language text. By dynamically adjusting the attention weights based on the relevance of each token to the task nodes, the model ensures more accurate and efficient task completion.

The large language model 704 outputs responses to the automation tasks based on the document, e.g., focuses on a given task with respect to the document, generates computer instructions that cause an automated task to be performed in an automated manner, and/or provides results of the given task. The code 200 analyzes an output 706 of the large language model and iteratively optimizes the output as needed. For example, the processor set analyzes the output results (output 706) of the large language model 704 and assesses whether the output results meet the requirements of the task, e.g., whether the large language model 704 accurately provided a response to one or more automation tasks. If the results do not meet the expectations, the processor set can adjust the tree of thoughts based on the model's feedback and re-input the data into the large language model until the task is satisfactorily completed. An adjustment of the tree of thoughts may include refining the structure of nodes and edges within the tree of thoughts based on insights gained from the large language model's feedback. Additionally, the code 200 may explore different traversal and description methods to enhance the effectiveness of the tree of thoughts in guiding the large language model's responses.

In some embodiments, the output 706 of the large language model 704 can be presented directly to users or serve as input for subsequent automated workflows. For example, in the context of invoice reimbursement, the large language model 704 can automatically extract and cross-check key information (such as invoice numbers, amounts, etc.) based on the tree of thoughts 702. For example, the structured representation of knowledge encapsulated within the tree of thoughts is leveraged in some embodiments. This structured framework aids in comprehending the information contained within documents, such as invoices or contracts. By utilizing the tree of thought trees, the large language model effectively navigates through the document's content and identifies key pieces of information, such as invoice numbers or contract dates. This structured approach facilitates a more comprehensive analysis of the document's contents and enables the accurate extraction of relevant data. The tree of thoughts facilitates the utilization of structured knowledge representation to enhance machine learning understanding and automated extraction of information from documents. The techniques described herein enable the automation of the reimbursement process, with the large language model 704 outputting accurately verified invoice information that can be automatically populated into the reimbursement system, thereby achieving an end-to-end automated reimbursement workflow.

In some embodiments, the system and/or method described herein provides for efficient processing of multiple document types. For example, by combining a tree of thoughts with layout analysis and other methods, the system and/or method organizes various types of documents into inputs that large language models can comprehend. This organization enables efficient automation processing of diverse document types, such as invoices, contracts, reports, and more. The system and/or method contribute to improving document processing efficiency and accuracy while reducing the cost and error rate of manual operations.

In some embodiments, the system and/or method described herein provide for flexible adaptation to different application scenarios. For example, the system and/or method exhibits strong generality and scalability, making the system and/or method adaptable to various application scenarios and task requirements. By adjusting the construction of a tree of thoughts and training data for the large language model, customization for different scenarios (e.g., invoice reimbursement, contract review, document summarization) can be achieved. This versatility allows the system and/or method to provide application value across a wide range of domains and scenarios.

Figure 8:
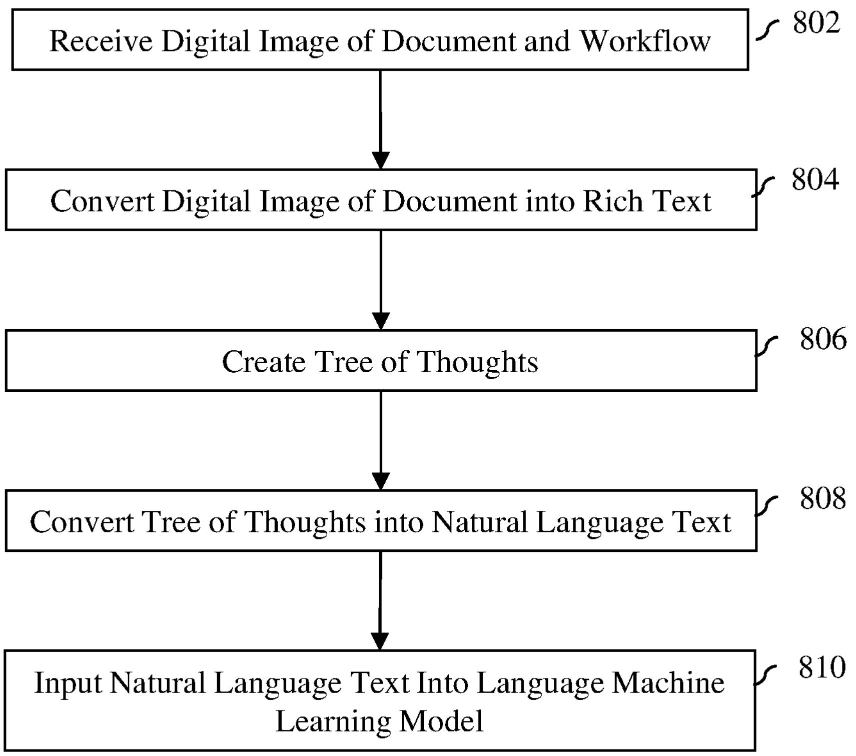
FIG. 8 is another flow diagram illustrating a method for multi-type document application in some embodiments.

FIG. 8 is a flow diagram illustrating a method of multi-type document analysis in some embodiments. As described above, the method can be performed by one or more processor sets executing programming code such as code 200. At 802, a processor set receives a scanned image such as a digital image of a document and a workflow describing an automation task, for example, at least one automation task. For example, as described with reference to FIG. 2, a workflow can pre-exist and be accessible to the processor set, and/or given by a user.

At 804, the processor set converts the scanned image such as the digital image of the document into rich text, for example, as described above with reference to FIG. 2, and for example, with reference to FIG. 3. The rich text includes layout information associated with text in the document. In some embodiments, the processor set uses computer vision and optical character recognition techniques to convert the scanned image of the document into a rich text. In some embodiments, the layout information includes images and captions of those images, e.g., associated captions, contained in the document. In some embodiments, the layout information includes formatting of document content contained in the document.

At 806, the processor set creates a tree of thoughts based on the rich text and the workflow, for example, as described above with reference to FIG. 2, and for example, with reference to FIG. 5. The tree of thoughts includes nodes and edges. In some embodiments, and as described above, the nodes can include or represent various content and/or structure of the document and the edges represent relationships between the nodes, e.g., content and/or structure. Task nodes that represent automation tasks specified in the workflow are also included in the tree of thoughts in at least some embodiments. The tree of thoughts binds content nodes representing at least some of the rich text with at least one task node representing at least one automation task. Content nodes refer to nodes that represent content (e.g., as determined by the rich text) of the document.

At 808, the processor set converts the content nodes, which are bound to at least one task node, and at least one task node into text in a natural language format, also described above, for example, with reference to FIG. 7. In some embodiments, the nodes of the tree of thoughts are traversed, for example, using tree traversal algorithms (such as breadth first search, depth first search, and/or others) and/or relationships among the nodes, and natural language text is generated that describes the nodes and relationships as structured in the tree of thoughts.

At 810, the processor set inputs the natural language text into a large language model with attention given to a token in the natural language representing at least one task node. The large language model outputs a result of completing at least one automation task, also described above, for example, with reference to FIG. 7. In some embodiments, the processor set iteratively inputs the natural language text into the large language model to complete at least one automation task. In some embodiments, the processor set presents the result output by the large language model on a user interface. In some embodiments, the processor set feeds the result output by the large language model into another automation task.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

receiving, by a processor set, a digital image of a document and a workflow describing an automation task;

converting, by the processor set, the digital image of the document into rich text that includes layout information in the document;

creating, by the processor set, based on the rich text and the workflow, a tree of thoughts that includes nodes and edges connecting the nodes in a tree data structure with hierarchical relationships, and that binds at least some nodes representing the rich text with a task node representing the automation task, wherein content of the document represented by said at least some nodes representing the rich text are associated with the task node representing the automation task in the tree data structure during construction of the tree of thoughts;

converting, by the processor set, the nodes and edges of the tree of thoughts into a natural language text;

inputting, by the processor set, the natural language text into a language machine learning model with attention given to a token in the natural language text representing the task node, the language machine learning model, in response, outputting a result of completing the automation task;

adjusting the tree of thoughts based on feedback from the language machine learning model's outputting of the result;

traversing the tree of thoughts differently in the converting of the nodes and edges of the tree of thoughts into the natural language text based on the feedback; and automatically populating an end product of the workflow using the result output by the language machine learning model.

2. The computer-implemented method of claim 1, wherein the inputting the natural language text into the language machine learning model includes iteratively inputting the natural language text to complete the automation task.

3. The computer-implemented method of claim 1, wherein computer vision and optical character recognition techniques are used to convert the digital image of the document into the rich text.

4. The computer-implemented method of claim 1, wherein the result output by the language machine learning model is presented on a user interface.

5. The computer-implemented method of claim 1, wherein the result output by the language machine learning model is fed into another automation task.

6. The computer-implemented method of claim 1, wherein the layout information includes images and associated captions contained in the document.

7. The computer-implemented method of claim 1, wherein the layout information includes formatting of document content contained in the document.

8. A computer program product comprising:

a set of one or more computer-readable non-transitory storage media; and program instructions, collectively stored in the set of one or more computer-readable non-transitory storage media, for causing a processor set to perform the following computer operations:

receive a digital image of a document and a workflow describing an automation task;

convert the digital image of the document into rich text that includes layout information in the document;

create, based on the rich text and the workflow, a tree of thoughts that includes nodes and edges connecting the nodes in a tree data structure with hierarchical relationships, and that binds at least some nodes representing the rich text with a task node representing the automation task, wherein content of the document represented by said at least some nodes representing the rich text are associated with the task node representing the automation task in the tree data structure during construction of the tree of thoughts;

convert the nodes and edges of the tree of thoughts into a natural language text; and input the natural language text into a language machine learning model with attention given to a token in the natural language text representing the task node, the language machine learning model, in response, outputting a result of completing the automation task;

adjust the tree of thoughts based on feedback from the language machine learning model's outputting of the result;

traverse the tree of thoughts differently in converting of the nodes and edges of the tree of thoughts into the natural language text based on the feedback; and automatically populate an end product of the workflow using the result output by the language machine learning model.

9. The computer program product of claim 8, wherein the natural language text is iteratively input into the language machine learning model to complete the automation task.

10. The computer program product of claim 8, wherein computer vision and optical character recognition techniques are used to convert the digital image of the document into the rich text.

11. The computer program product of claim 8, wherein the result output by the language machine learning model is presented on a user interface.

12. The computer program product of claim 8, wherein the result output by the language machine learning model is fed into another automation task.

13. The computer program product of claim 8, wherein the layout information includes images and associated captions contained in the document.

14. The computer program product of claim 8, wherein the layout information includes formatting of document content contained in the document.

15. A computer system comprising:

a processor set including at least one hardware processor;

a set of one or more computer-readable storage media; and program instructions, collectively stored in the set of one or more computer-readable storage media, for causing the processor set to perform the following computer operations:

receive a digital image of a document and a workflow describing an automation task;

convert the digital image of the document into rich text that includes layout information in the document;

create, based on the rich text and the workflow, a tree of thoughts that includes nodes and edges connecting the nodes in a tree data structure with hierarchical relationships, and that binds at least some nodes representing the rich text with a task node representing the automation task, wherein content of the document represented by said at least some nodes representing the rich text are associated with the task node representing the automation task in the tree data structure during construction of the tree of thoughts;

convert the nodes and edges of the tree of thoughts into a natural language text;

input the natural language text into a language machine learning model with attention given to a token in the natural language text representing the task node, the language machine learning model, in response, outputting a result of completing the automation task;

adjust the tree of thoughts based on feedback from the language machine learning model's outputting of the result;

traverse the tree of thoughts differently in converting of the nodes and edges of the tree of thoughts into the natural language text based on the feedback; and automatically populate an end product of the workflow using the result output by the language machine learning model.

16. The computer system of claim 15, wherein the natural language text is iteratively input into the language machine learning model to complete the automation task.

17. The computer system of claim 15, wherein computer vision and optical character recognition techniques are used to convert the digital image of the document into the rich text.

18. The computer system of claim 15, wherein the result output by the language machine learning model is presented on a user interface.

19. The computer system of claim 15, wherein the result output by the language machine learning model is fed into another automation task.

20. The computer system of claim 15, wherein the layout information includes images and associated captions contained in the document.

* * * * *